United States Patent
Ling et al.

(10) Patent No.: US 10,230,424 B2
(45) Date of Patent: Mar. 12, 2019

(54) MICROWAVE BACKHAUL SYSTEM SUPPORTING MULTIPLE INSTALLATION CONFIGURATIONS

(71) Applicant: MaxLinear, Inc., Carlsbad, CA (US)

(72) Inventors: Curtis Ling, Carlsbad, CA (US); Kishore Seendripu, Carlsbad, CA (US); Raja Pullela, Irvine, CA (US); Madhukar Reddy, Carlsbad, CA (US); Timothy Gallagher, Encinitas, CA (US)

(73) Assignee: Maxlinear, Inc., Carlsbad, CA (US)

( * ) Notice: Subject to any disclaimer, the term of this patent is extended or adjusted under 35 U.S.C. 154(b) by 180 days.

(21) Appl. No.: 14/492,143

(22) Filed: Sep. 22, 2014

(65) Prior Publication Data

US 2015/0087226 A1 Mar. 26, 2015

Related U.S. Application Data

(60) Provisional application No. 61/881,016, filed on Sep. 23, 2013, provisional application No. 61/884,765, filed on Sep. 30, 2013.

(51) Int. Cl.
*H04B 1/40* (2015.01)
*H04B 1/74* (2006.01)
*H04L 25/02* (2006.01)
*H04L 27/20* (2006.01)
(Continued)

(52) U.S. Cl.
CPC ............ *H04B 1/745* (2013.01); *H04B 1/0067* (2013.01); *H04B 1/40* (2013.01); *H04H 60/19* (2013.01);
(Continued)

(58) Field of Classification Search
CPC .......... H04B 1/40; H04B 1/401; H04B 1/403; H04B 1/405; H04B 1/50; H04B 1/52; H04B 1/54; H04B 1/56; H04B 1/58; H04B 1/05; H04B 1/0053; H04B 1/0067; H04B 1/0071; H04B 1/0075; H04B 1/0078;
(Continued)

(56) References Cited

U.S. PATENT DOCUMENTS

2003/0023978 A1* 1/2003 Bajgrowicz ............ H04H 40/90
725/68
2004/0218681 A1* 11/2004 McNeely ................ H04L 27/28
375/260
(Continued)

*Primary Examiner* — Dong-Chang Shiue
(74) *Attorney, Agent, or Firm* — McAndrews, Held & Malloy, Ltd.

(57) ABSTRACT

A monolithic integrated circuit for use in a microwave backhaul system may comprise a plurality of microwave transceivers and outdoor-unit to indoor-unit (ODU/IDU) interface circuitry. The monolithic integrated circuit may be configurable into an all-outdoor configuration in which the ODU/IDU interface circuitry is disabled. The monolithic integrated circuit may be configurable into a split-indoor-and-outdoor configuration in which the ODU/IDU interface circuitry is enabled to communicate signals between an outdoor unit of the microwave backhaul system and an indoor unit of the microwave backhaul system. While the monolithic integrated circuit is configured in the split-indoor-and-outdoor configuration, the ODU/IDU interface circuitry may be configurable to operate in at least a non-stacking mode and a stacking mode.

20 Claims, 8 Drawing Sheets

(51) Int. Cl.
*H04L 27/22* (2006.01)
*H04H 60/19* (2008.01)
*H04B 1/00* (2006.01)
*H04L 27/36* (2006.01)
*H04L 27/38* (2006.01)

(52) U.S. Cl.
CPC .............. *H04L 25/02* (2013.01); *H04L 27/20* (2013.01); *H04L 27/2003* (2013.01); *H04L 27/22* (2013.01); *H04L 27/36* (2013.01); *H04L 27/362* (2013.01); *H04L 27/38* (2013.01)

(58) Field of Classification Search
CPC ... H04B 1/0092; H04B 1/0096; H04L 1/0003; H04H 20/63; H04H 40/90; H03J 1/0008
See application file for complete search history.

(56) References Cited

U.S. PATENT DOCUMENTS

| | | | |
|---|---|---|---|
| 2007/0083898 A1* | 4/2007 | Norin | H03J 1/0008 725/68 |
| 2008/0222682 A1* | 9/2008 | Beales | H04H 20/63 725/70 |
| 2012/0224527 A1* | 9/2012 | Krafft | H04H 20/63 370/319 |
| 2013/0059551 A1* | 3/2013 | Ginsburg | H04B 1/44 455/78 |
| 2013/0094554 A1* | 4/2013 | Kennard | H04B 7/0613 375/222 |
| 2014/0185704 A1* | 7/2014 | Sturkovich | H04L 1/0003 375/296 |

\* cited by examiner

MICROWAVE BACKHAUL SYSTEM SUPPORTING MULTIPLE INSTALLATION CONFIGURATIONS

PRIORITY CLAIM

This application claims priority to and the benefit of the following application(s), each of which is hereby incorporated herein by reference:

U.S. provisional patent application 61/881,016 titled "Microwave Backhaul Methods and Systems" filed on Sep. 23, 2013; and U.S. provisional patent application 61/884,765 titled "Microwave Backhaul Methods and Systems" filed on Sep. 30, 2013.

INCORPORATION BY REFERENCE

The entirety of each of the following is incorporated herein by reference:

United States Patent Application Publication 20130205349 titled "Method and System for Integrated Stacking for Handling Channel Stacking or Band Stacking;" and U.S. patent application Ser. No. 14/249,014 titled "Automatic Twist and Sway Compensation in a Microwave Backhaul Transceiver."

TECHNICAL FIELD

Certain embodiments of the invention relate to wireless communications. More specifically, certain embodiments of the invention relate to methods and systems for microwave backhaul.

BACKGROUND

Conventional methods and systems for microwave backhaul are inefficient. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Systems and methods are provided for microwave backhaul, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting. As used herein, "microwave" frequencies range from approximately 300 MHz to 300 GHz and "millimeter wave" frequencies range from approximately 30 GHz to 300 GHz. Thus, the "microwave" band includes the "millimeter wave" band.

Figure 1:
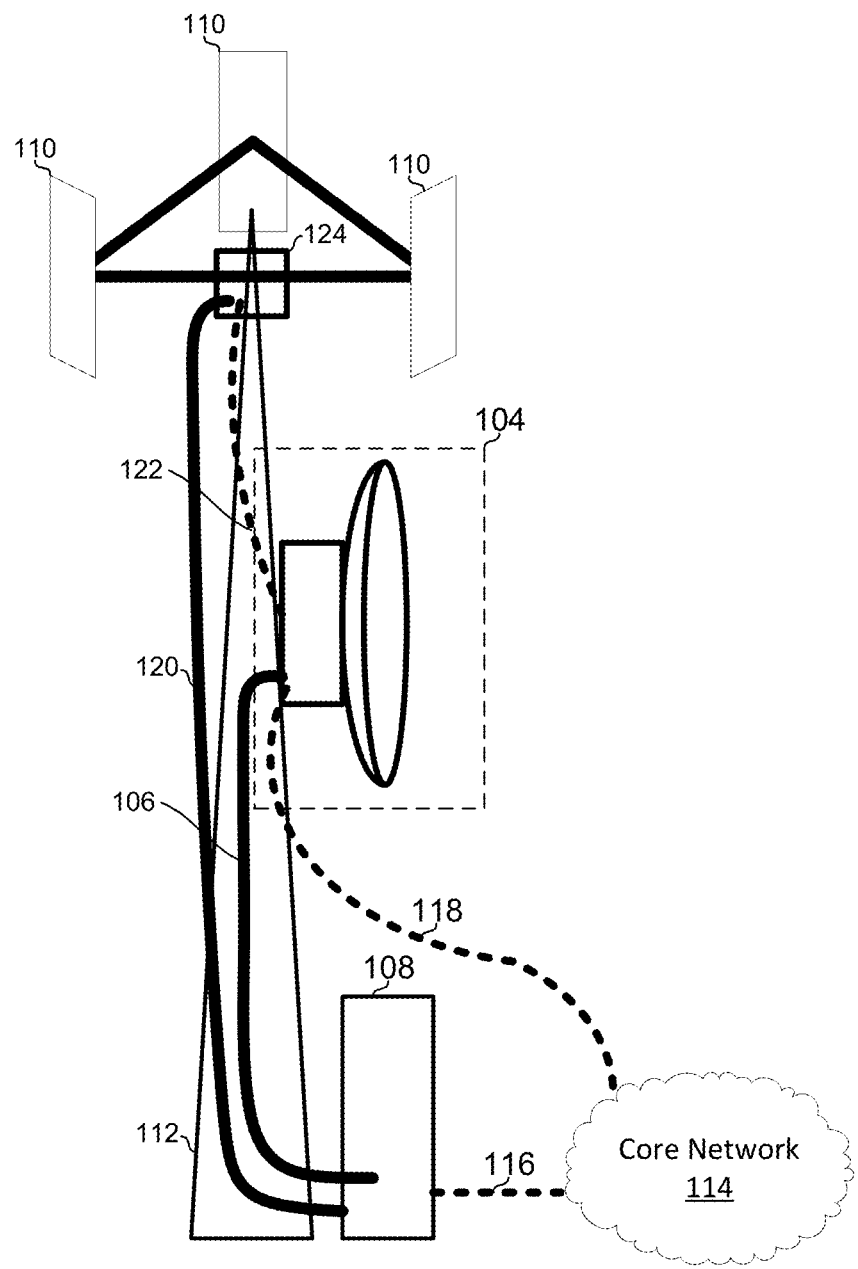
FIG. 1 shows an example microwave backhaul outdoor unit mounted to a cellular tower

FIG. 1 shows an example microwave backhaul outdoor unit mounted to a cellular tower. The example implementation depicted comprises cellular antennas 110, cellular signal processing unit 124, a mast 112, a microwave backhaul outdoor unit (ODU) 104, and an indoor unit (IDU) 108.

The cellular antennas 110 may capture cellular signals and output the signals to cellular processing circuitry 124. In an example implementation, the circuitry 124 may output common public radio interface (CPRI) signals to the IDU 108 via cable 120 and demodulation of the cellular signals may be carried out in circuitry of the IDU 108. In an example implementation, the circuitry 124 may perform demodulation of the cellular signals and may output demodulated data onto the cable 122 in accordance with a determined networking standard (e.g., Gigabit Ethernet over coax or fiber).

Figure 2:
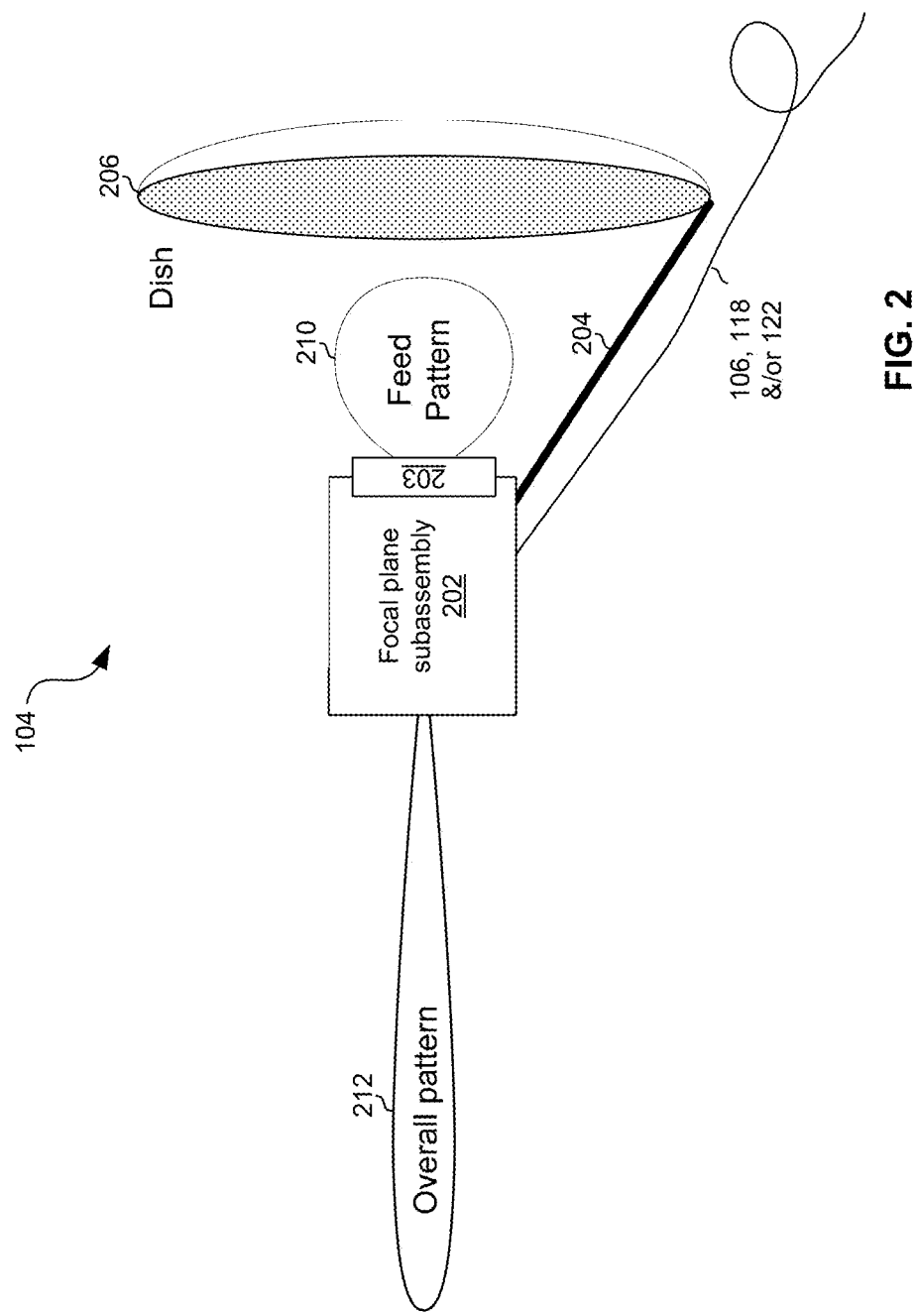
FIG. 2 shows an example implementation of a steerable microwave backhaul outdoor unit.

The backhaul ODU 104 may comprise one or more antenna elements and circuitry for processing microwave signals received via the antenna elements. The antenna elements may be, for example, feedhorns and/or microstrip patches. The antenna elements may directly receive backhaul signals or may receive them via a parabolic reflector or lens. FIG. 2, discussed below, depicts an example implementation in which a parabolic reflector is utilized. The circuitry may comprise one or more semiconductor dies ("chips" or "chipsets") arranged on one or more printed circuit boards. Examples of such chips or chipsets include chips or chipsets 402, 520, and 550 described below.

The IDU 108 may comprise circuitry for processing: signals received from the cellular circuitry 124, signals to be sent to the cellular circuitry 124, signals received from the backhaul ODU 104, signals to be sent to the backhaul ODU, signals received from the core network 114, and/or signals to be sent to the core network 114 (e.g., via a wired, fiber, and/or wireless connection 116 and/or via the link 106 and the microwave link). The IDU 108 may perform switching/routing functions for relaying traffic among the cellular circuitry 124, the backhaul ODU 104, and the core network 114.

In an example implementation, such as the implementation described with reference to FIG. 5B below, functions traditionally performed by the IDU 108 may be performed by the cellular circuitry 124 (e.g., modulation and demodulation in accordance with standards used by the cellular network), by circuitry of the backhaul ODU 104 (e.g., modulation and demodulation in accordance with standards used for the microwave backhaul link), and/or by other circuitry mounted on the mast 112 (e.g., a switch/router for routing traffic among the core network 114, the cellular circuitry 124, and the backhaul ODU 104). Eliminating the IDU may be advantageous because, for example, it may eliminate the need to lease real estate adjacent to the mast, and may reduce power consumption.

In implementations in which the IDU 108 is present, cable 120 (which may be metal or fiber) may carry CPRI signals if cellular modulation/demodulation is performed by circuitry in the IDU 108, or carry Ethernet (or some other networking protocol) signals if cellular modulation/demodulation is performed by circuitry 124. In implementations in which the IDU 108 is eliminated, cable 120 may likewise be eliminated.

In implementations in which the IDU 108 is present, cable 106 (which may be metal or fiber) may carry a single backhaul channel converted down to an intermediate frequency (IF), or may carry multiple backhaul channels converted down to an IF and "stacked" as described below with reference to FIG. 6, for example. There may be multiple cables 106, each carrying a respective one of a plurality of captured backhaul channels or carrying a respective one of a plurality of sets of stacked channels. In implementations in which the IDU 108 is not present, cable(s) 106 may likewise be eliminated.

In all-outdoor backhaul implementations in which the IDU 108 is absent, cable(s) 118 may carry Ethernet (or some other networking protocol) signals between the ODU 104 and the core network 114. In implementations in which the IDU 108 is present, cable(s) 118 may be eliminated.

In all-outdoor backhaul implementations in which the IDU 108 is absent, cable(s) 122 may carry Ethernet (or some other networking protocol) signals between the cellular circuitry 124 and the ODU 104. In implementations in which the IDU 108 is present, cable(s) 122 may be absent.

FIG. 2 shows an example implementation of a steerable microwave backhaul outdoor unit. The example ODU 104 shown comprises a subassembly 202 mounted to a support structure 204 (which may, in turn, mount the assembly to the mast/tower 112, building, or other structure, which are not shown in FIG. 2), and one or more cables 106, 118, and/or 122 which carry traffic among the ODU 104, the indoor unit 108, and the cellular circuitry 124. The subassembly 202 may be mounted such that the antenna elements are positioned at or near a focal plane of the reflector 206. The subassembly may comprise, for example, one or more chips arranged on one or more printed circuit boards. The subassembly 202 comprises an antenna array 203 which in turn comprises a plurality of antenna elements. The antenna elements may be, for example, horns and/or microstrip patches. In the example implementation depicted, the antenna elements capture signals reflected by reflector 206 for reception and bounce signals off the reflector 206 for transmission. The radiation pattern 210 of the antenna array 202 corresponds to a radiation pattern 212 before (for reception), or after (for transmission), reflection off the reflector 206. Although the radiation patterns may comprise multiple lobes, only a main lobe is shown for simplicity of illustration. In another implementation, the antenna elements may directly receive backhaul signals, or receive them through a lens, for example.

Figure 3:
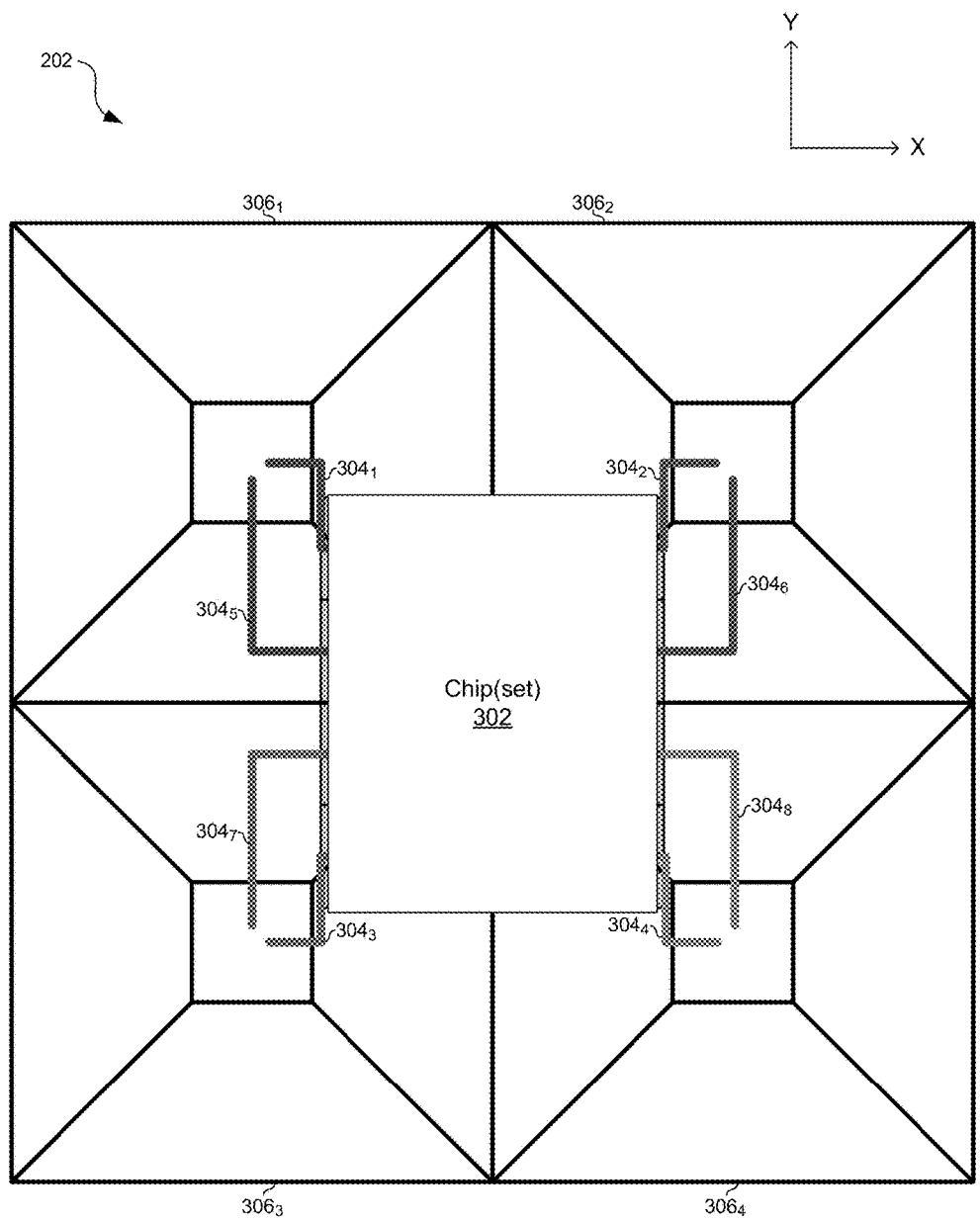
FIG. 3 shows an example implementation of the subassembly of FIG. 2.

FIG. 3 shows an example implementation of the subassembly of FIG. 2. The example subassembly 202 comprises four feed horns $306_1$-$306_4$, and a chip (or chipset) 302 which comprises eight transceivers for supporting two polarizations (e.g., horizontal and vertical, or clockwise and counterclockwise) for each feed horn 306. Each of the feed lines $304_1$-$304_8$ corresponds to a particular polarization of a particular one of the feed horns 306.

Although a four-feed-horn, eight-transceiver subassembly 202 is used for illustration, various implementations of the subassembly 202 may comprise any number of feed horns and any number of transceivers.

The feed lines $304_1$-$304_4$ correspond to a first polarization and the feed lines $304_5$-$304_8$ correspond to a second polarization. Accordingly, the subassembly 104 may be operable to, for example, concurrently receive two different signals on the same frequency but having different polarizations, concurrently transmit two different signals on the same frequency but having different polarizations, transmit a first signal on a particular frequency and first polarization while concurrently receiving a second signal on the same frequency and having a second polarization, concurrently receive two different signals on two polarizations on a first frequency and transmit two different signals on two polarizations on a second frequency. Furthermore, the radiation pattern for the two polarizations may be controlled independently of one another. That is, two independent sets of amplitude and phase beamforming coefficients may be maintained by circuitry 302.

Figure 4:
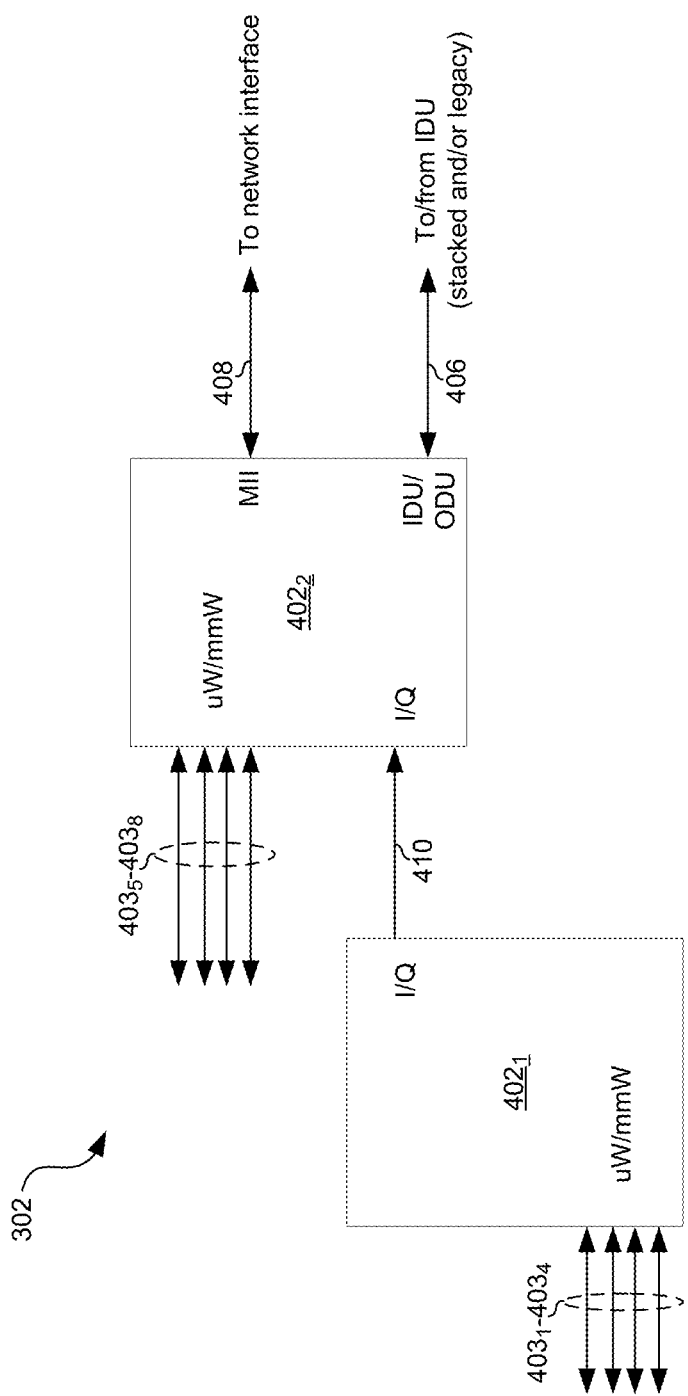
FIG. 4 shows an example implementation of the chipset of FIG. 3.

FIG. 4 shows an example implementation of the chipset of FIG. 3. In the example implementation depicted, the chipset 302 comprises two instances of the same chip 402, but with the two chips being differently configured. Each of the chips $402_1$ and $402_2$ may be, for example, a monolithic CMOS chip. Although not shown, the chipset may additionally comprise one or more monolithic low noise amplifier (LNA) chips and one or more monolithic power amplifier (PA) chips.

Each of the signals $403_1$-$403_8$ is a microwave signal received and/or transmitted via a respective one of feed lines $304_1$-$304_8$. In an example implementation, the signal(s) 410 represent one or more digital in-phase and quadrature phase (I/Q) signal pairs, each I/Q pair from $402_1$ to $402_2$ being the result of processing of the signals $403_1$-$403_4$.

The signals 410 are communicated between one or more auxiliary interfaces 506 (described below with reference to FIGS. 5A-5C). For reception, the processing to generate an I/Q pair may comprise, for example, amplification, quadrature downconversion, filtering, and digitization. For transmission, the processing to generate an I/Q pair may comprise, for example, filtering, FEC encoding, and bit-to-symbol mapping, and quadrature upconversion.

The signals 408 may be conveyed in accordance with a media independent interface (MII) (e.g., GMII, RGMII or the like). For reception, the signal 408 may carry one or more datastreams recovered from one or more demodulated microwave backhaul channels and may be destined for a network interface (e.g., an Ethernet MAC/PHY). For transmission, the signal 408 may carry one or more datastreams from a network interface (e.g., Ethernet MAC/PHY) to be transmitted on one or more microwave backhaul channels.

The signals 406 comprise intermediate frequency (IF) signals generated by the interface 510 (described below with reference to FIG. 5A-5C).

Figure 5A:
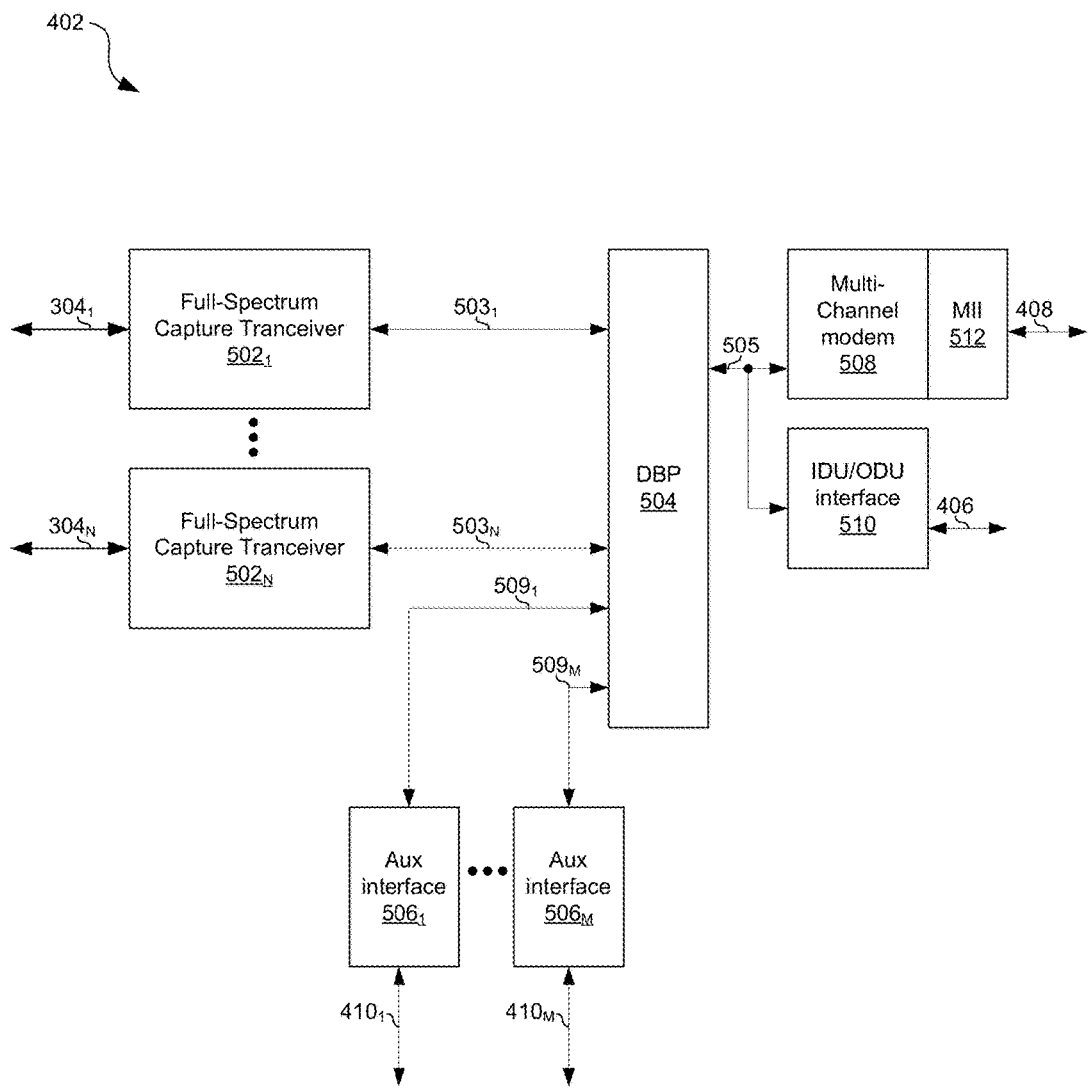
FIG. 5A shows an example implementation of a chip of the chipset of FIG. 3.

Referring to FIG. 5A, the chip 402 comprises N (a positive integer) full-spectrum capture (FSC) transceivers 502, a digital baseband processor (DBP) 504, a multichannel modem 508, an IDU/ODU interface 510, and M (a positive integer) auxiliary interfaces $506_1$-$506_M$.

For receiving microwave backhaul signals via a corresponding feed line $304_n$, FSC transceiver $502_n$ (where $1 \leq n \leq N$) may comprise circuitry (e.g., amplifier(s), filter(s), quadrature downconverter(s), analog-to-digital converter(s), and/or the like) operable to concurrently digitize and downconvert all, or substantially all, of a particular frequency band that encompasses multiple channels of a wireless standard or protocol in use on a microwave backhaul link. For example, each transceiver $502_n$ may be operable to concurrently digitize and quadrature downconvert a particular polarization of the entire 17.1 GHz to 19.7 GHz band which encompasses multiple 112-MHz-wide channels. For reception, each transceiver $502_n$ may output a digital I/Q signal pair (represented as $503_n$ in FIG. 5A) resulting from amplification, quadrature downconversion, filtering, and digitization performed in the transceiver $502_n$.

For transmitting microwave backhaul signals via a corresponding feed line $304_n$, FSC transceiver $502_n$ may comprise circuitry (e.g., digital-to-analog converters, quadrature upconverter(s), filter(s), amplifier(s), and/or the like) operable to modulate digital I/Q signals for transmission on a desired one or more channels of a particular frequency band that encompasses multiple channels of a wireless standard or protocol in use on a microwave backhaul link. For example, each transceiver $502_n$ may be operable to modulate a pair of I/Q signals onto any one or more of a plurality of 112-MHz-wide channels in the 17.1 GHz to 19.7 GHz band. For transmit operations, a pair of I/Q signals represented as $503_n$ may be input to the transceiver $502_n$ where the pair of signals may be converted to an analog representation, upconverted, and amplified for output on a corresponding feed line 304.

The DBP 504 is operable to perform various digital signal processing operations for reception and transmission of microwave backhaul signals. Some example capabilities of the DBP 504 include the following.

The DBP may be operable to perform I/Q mismatch calibration.

The DBP 504 may be operable to perform cross polarization interference cancellation (XPIC). In a split indoor and outdoor implementation, performing XPIC in the ODU 104 may enable treating different polarizations as independent links such that the IDU 108 need not be aware of the use of two different polarizations. This allows IDUs which do not have XPIC capabilities to be used in a dual polarization link to double the spectral efficiency. The ODU 104 may send the two polarizations down separate coax cables 106, or may stack the two polarizations onto a single cable 106 by placing them at different frequencies on the cable 106.

The DBP 504 may be operable to control the phase and/or amplitude of the signal pairs $503_1$-$503_N$ and $509_1$-$509_N$ to achieve beamforming (or "steering") in transmit and/or receive directions. Beamforming may be used to automatically align one or more beams 212 of the ODU 104 with one or more communication partners (other ODUs) as described, for example, in the above-incorporated U.S. patent application Ser. No. 14/249,014.

The DBP 504 may be operable to perform channelization whereby, for reception, desired channels of the captured frequency band(s) may be selected and downconverted for output to the ODU/IDU interface 510 and/or modem 508. This may drastically reduce the amount of bandwidth that the modem 508 and ODU/IDU interface 510 need to support. For example, the modem 508 and ODU/IDU interface 510 may only need to support a few 112 MHz channels as opposed to the entire 17.1 GHz to 19.7 GHz band. Similarly, for transmission, the DBP 504 may be operable to receive modulated baseband signals 505 and upconvert them to selected channels of the microwave band(s).

The DBP 504 may be operable to perform channel aggregation. To do so in the transmit direction, several channels from the multichannel modem 508 and/or the IF interface 510 may be digitally combined (e.g., by upsampling, frequency shifting and summing) to provide a single digital I/Q stream that contains several channels at different frequencies. To do so in the receive direction, the DBP 504 may accept a single I/Q stream from an FSC transceiver $502_n$. Within this stream are multiple channels at different frequencies. The DBP 504 may performs filtering, digital downconversion and downsampling on of a desired plurality of the multiple channels, and provides a corresponding plurality of (lower bandwidth) I/Q streams to the multichannel modem 504 and/or IF interface 510, each of which contains information from only a single channel.

The DBP 504 may be operable to measure characteristics of received signals and generate control signals based on the characteristics. For example, the DBP 504 may be operable to generate gain control signals for controlling gain and/or linearization of the transceivers $502_1$-$502_N$ and/or in off-chip amplifiers.

The signal 505 may be a modulated baseband signal. For transmission, the modem 508 may, for example, perform FEC encoding of a bitstream received via interface 512 and bit-to-symbol mapping to generate signal 505. For reception, the modem 508 may, for example, perform symbol-to-bit demapping of the signal 505 and FEC decoding to recover a bitstream output to interface 512.

The media independent interface (MII) 512 may convey signals in accordance with a standard/protocol such as GMII, RGMII, or the like. The MII 512 may interface to, for example, an Ethernet MAC/PHY (e.g., 1GBase-T, GEPON, 10GBase-T, 10G-EPON, or the like).

For reception, the ODU/IDU interface 510 may frequency-shift the signal 505 to an intermediate frequency band supported by the associated IDU 108. For IDUs which do not support channel stacking (stacking is described below with reference to FIG. 6 and in the above-incorporated U.S. Patent Application Publication 20130205349), each channel of signal 505 may be shifted to the same frequency channel and output on its own coaxial cable. For IDUs 108 which do support stacking, M channels of the signal 505 may be shifted to M non-overlapping frequency channels and then the plurality of stacked channels may be conveyed to the IDU 108 via a single coaxial cable. Circuitry (e.g., an instance of chip 402) in the IDU 108 may then un-stack the channels back to baseband before conveying them to respective baseband processing paths.

For transmission, the ODU/IDU Interface 510 may frequency shift one or more frequency bands on one or more coaxial cables to baseband. For IDUs which do not support channel stacking, each of K (an integer) signals received via a respective one of K coaxial cables may be shifted to baseband for conveyance to the DBP 504 via a respective one of K signal paths. For IDUs 108 which do support stacking, each of K stacked channels received via a single coaxial cable may be shifted to baseband for conveyance to the DBP 504 via a respective one of K signal paths.

The presence of both the modem 508 and the ODU/IDU interface 510 allow the chip 402 to be backward compatible with existing IDUs which expect a dedicated coaxial cable for each channel between the ODU and IDU, forward compatible with IDUs which support channel stacking, and forward compatible with "all-outdoor" installations where there is no IDU.

The DBP 504 may be operable to support more than N transmit and N receive channels, where N is the number of on-chip transceivers 502. For example, the DBP 504 may be operable to concurrently process N+M I/Q pairs such that it can concurrently process the N signals from the on-chip transceivers $503_1$-$503_N$ as well as up to M signals from off-chip transceivers connected via the auxiliary interface(s) $506_1$-$506_M$. The DBP 504 may treat I/Q pairs (represented as 509 in FIG. 5A) to/from the off-chip transceivers the same as I/Q pairs 503 from on-chip transceivers $502_1$-$502_N$. Where the off-chip transceivers are transceivers of a second instance of 402, the DBP 504 of the second instance of 402 may be operable to close a loop-through between the pairs 503 and 509 (i.e., pair $503_1$ of the second instance may be connected to pair $509_1$ of the second instance, pair $503_2$ of the second instance to pair $509_2$ of the second instance, and so on).

Each auxiliary interface $506_m$ may be operable to send signals 410 off-chip and receive signals 410 from off-chip. This may enable multiple instances of chip 402 to be used together in a modular, scalable approach. Referring to FIGS. 4 and 5A, assuming, for illustration, that each chip 402 comprises four transceivers, then driving a four-horn array with two polarizations requires eight transceivers. Accordingly, two instances of the chip 402 may be used and the outputs $503_1$-$503_4$ of the transceivers $502_1$-$502_4$ of chip $402_1$ may be conveyed to chip $402_2$ via the auxiliary interfaces $506_1$-$506_M$ of the two chips. In this example implementation, the DBP 504 of chip $402_1$ may be configured for loop-through of signals $503_1$-$503_4$ to signals $509_1$-$509_4$, while other portions of the DBP 504 and the modem 508 and ODU/IDU interface 510 of chip $402_1$ may be powered down in chip $402_1$. The DBP 504 of chip $402_2$ may be configured to process the eight I/Q pairs (four received via the transceivers $502_1$-$502_4$ of chip $402_2$ and four received as signals 410 via the auxiliary interfaces) to generate a corresponding one or more baseband signals 505.

In an example implementation, each signal $410_m$ may be, for example, a digital I/Q pair similar to signal $503_n$. In another example implementation, each signal $410_m$ may carry information of one or more digital I/Q pairs 503 suitable formatted for transmission between instances of chip 402. For example, an auxiliary interface $506_m$ may be operable to perform serialization and/or deserialization such that the N I/Q pairs may be transmitted over less than 2*N pins connecting the chips $402_1$ and $402_2$.

Figure 5B:
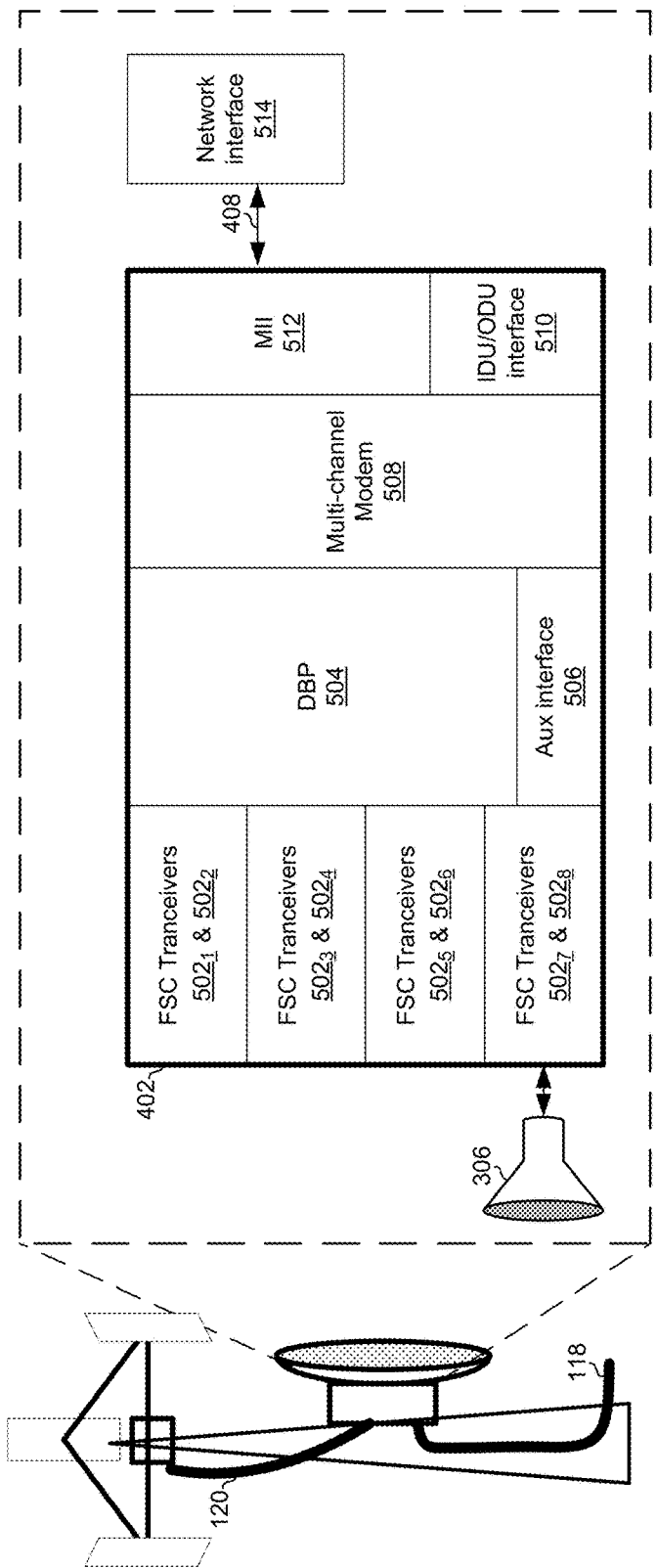
FIG. 5B shows an example all-outdoor implementation comprising the chip of FIG. 5A.

FIG. 5B shows an example all-outdoor implementation comprising the chip of FIG. 5A. For reception, microwave backhaul signals are received via one or more antenna element(s) 306 and processed by one or more transceivers 502 to generate digital I/Q signals. The digital I/Q signals are then processed by the DBP 504. Particular channels selected by the DBP 504 are then conveyed to the modem 508 where they are demodulated to recover bitstreams which are then output to a network (e.g., Ethernet network) via the MII 512. For transmission, bitstreams are received from the network via the MII, modulated by modem 508, processed by DBP 504 to generate digital I/Q signals which are then conveyed to one or more transceivers 502 for transmission via the one or more antenna elements 306.

In an example implementation, transceivers $502_1$ and $502_2$ may be configured for processing a first microwave frequency band, transceivers $502_3$ and $502_4$ may be configured for processing a second microwave frequency band, transceivers $502_5$ and $502_6$ may be configured for processing a third microwave frequency band, and transceivers $502_7$ and $502_8$ may be configured for processing a fourth microwave frequency band. Thus, instances of a single chip 402 may be used in a variety of backhaul towers which use a variety of frequency bands and configuration for a particular backhaul tower may comprise connecting the antenna elements to the appropriate one(s) of transceivers $502_1$-$502_8$. In the example shown in FIG. 5B, a single antenna element 306 and transceiver $502_7$ are used for backhauling a single polarization on a single frequency band. In another example scenario, a second antenna element 306 may be coupled to transceiver $502_8$ and two polarizations of the frequency band may be used for the particular backhaul link.

In another example scenario, one or more antenna elements 306 may be coupled to two or more of the transceivers 502 via one or more switching elements which may be dynamically controlled based on a frequency band to be used for a particular transmission or reception. For example, two antenna elements 306 may be time division multiplexed between transceivers $502_7$ and $502_8$ and transceivers $502_1$ and $502_2$, where transceivers $502_7$ and $502_8$ are configured for communication on a first frequency band and transceivers $502_1$ and $502_2$ are configured for communication on a second frequency band.

Figure 5C:
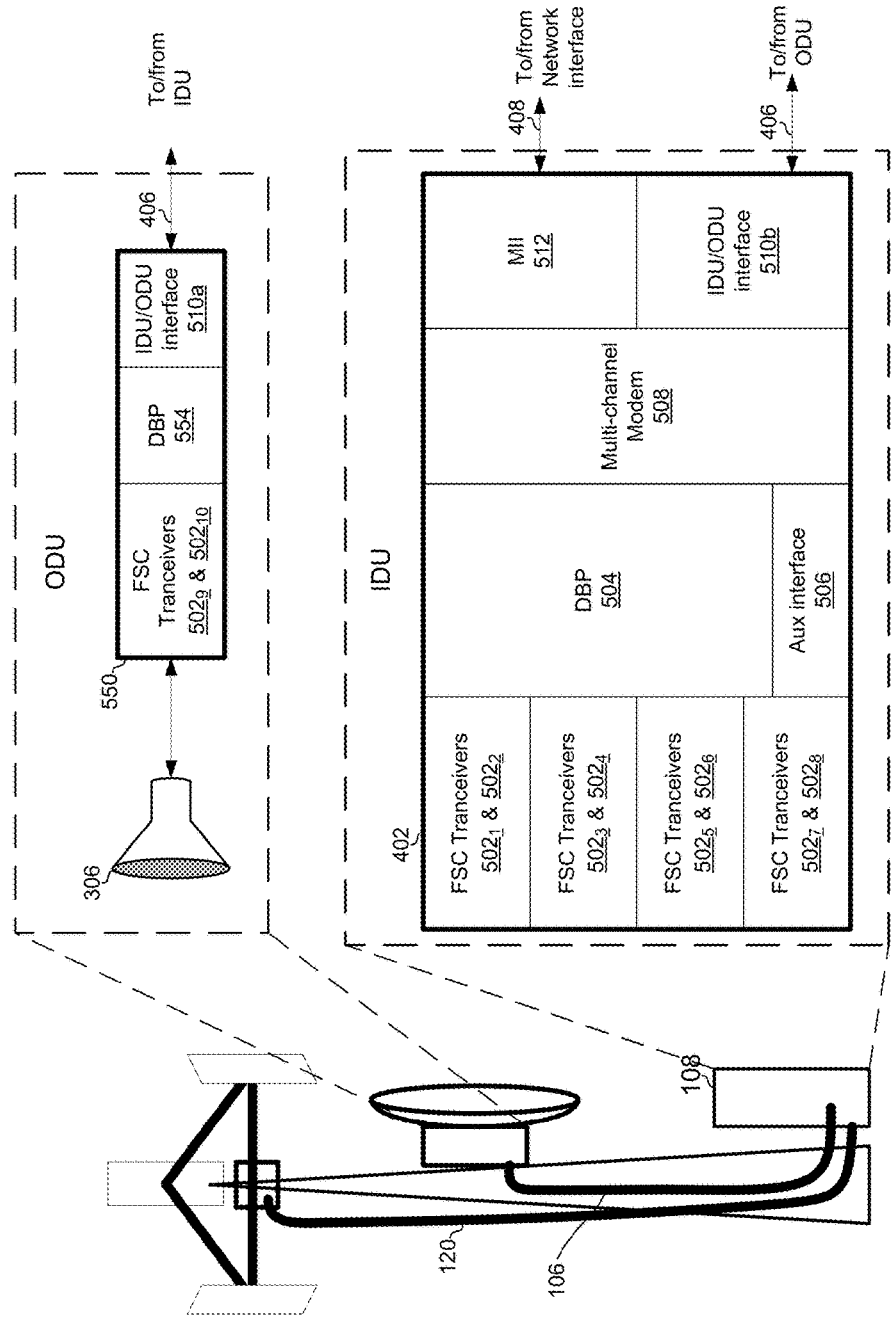
FIG. 5C shows an example split indoor/outdoor implementation comprising the chip of FIG. 5A.

FIG. 5C shows an example split indoor/outdoor implementation comprising the chip of FIG. 5A. For reception, backhaul signals are received via one or more antenna element(s) 306 coupled to a chip 550 that is configured to operate as an ODU. The received microwave signals are processed by one or more transceivers 502 to generate digital I/Q signals which are then processed by DBP 554 and interface 510a (an instance of interface 510) for output to chip 402, which is configured as an IDU in FIG. 5C. The interface [TG added 'e'] 510b (an instance of interface 510) of the IDU processes the signals from the ODU and conveys them to the DBP 504 where they are further processed. The signals conveyed between the IDU and ODU in FIG. 5C may be as described below with reference to FIG. 6, for example. Particular channels selected by the DBP 504 are then conveyed to the modem 508 where they are demodulated to recover bitstreams which are then output to a network (e.g., Ethernet network) via the MII 512.

For transmission, bitstreams received from the network via the MII 512 are modulated by modem 508, and processed by DBP 504 to generate digital I/Q signals. The I/Q signals are then conveyed to interface 510b of the IDU. The interface 510b of the IDU conveys the signals to the interface 510a of the ODU. The signals conveyed between the IDU and ODU in FIG. 5C may be as described below with reference to FIG. 6, for example. The interface 510a outputs digital I/Q signals to the DBP 554 for processing prior to conveying them to transceivers $502_9$ and $502_{10}$ for transmission via the one or more antenna elements 306. For such transmission, the transceivers 502, portions of DBP 504, and auxiliary interface 506 of the chip 402 may be unneeded and powered down.

This may be the case because the chips 550 and 402 may be two instances of the same chip, but with 550 configured for use as an ODU and 402 configured for use as an IDU. In another implementation, the ODU and IDU may be implemented by different chips where each of which has only the circuitry necessary for performing its respective role. In such an implementation, the DBP 554 may perform only a subset of the functions of the DBP 504 described above, and the modem 508, the MII 512, and the auxiliary interfaces 506 may not be implemented on the chip 550.

Figure 6:
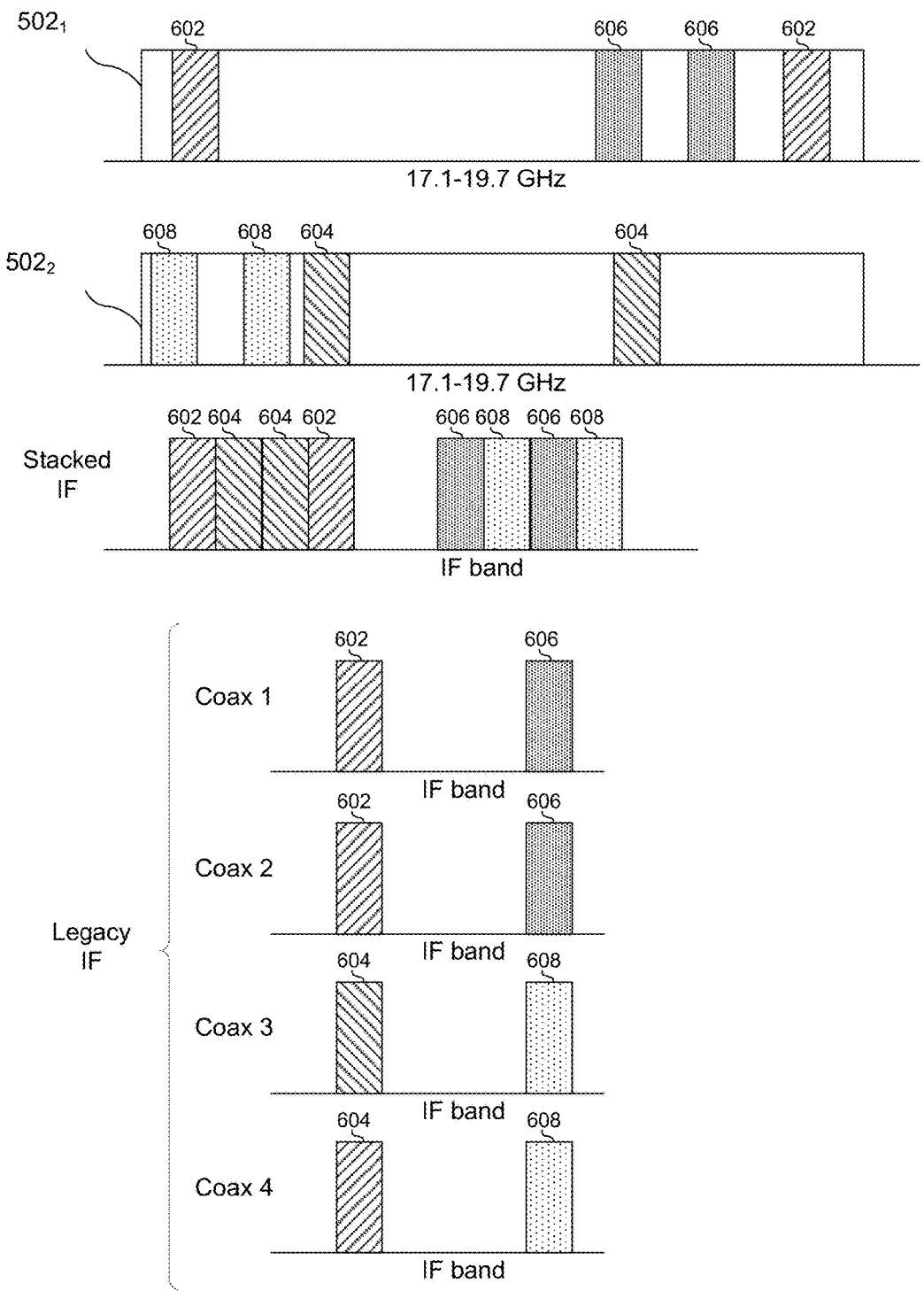
FIG. 6 shows example signals communicated via an IDU/ODU interface.

FIG. 6 shows example signals communicated via the IDU/ODU interface 510. The example signals correspond to an example implementation in which each of the transceivers $502_1$ and $502_2$ (FIG. 5A) has sufficient bandwidth such that it is operable to concurrently handle the entire 17.1 to 19.7 GHz microwave band.

In operation of the example implementation shown, for the reception over the microwave link, energy in the 17.1 to 19.7 GHz band is captured by one or more antenna elements 306 and conveyed to the transceivers $502_1$ and $502_2$. For example, each of the transceivers may receive the same signals via the same feed lines of the same antenna element different signals via different feed lines of the same antenna elements, or different signals via different antenna elements. The transceiver $502_1$ processes the signal(s) it receives to select channels 602, as shown in the first spectral graph of FIG. 6. The transceiver $502_2$ processes the signal(s) it receives to select channels 604, as shown in the second spectral graph of FIG. 6. The ODU/IDU interface then converts the channels to a desired intermediate frequency. In some instances, each of the channels 602 and 604 may be converted to a different frequency such that the channels are "stacked" onto a single cable, as illustrated by the third spectral graph of FIG. 6. In some instances, each of the channels 602 and 604 may be converted to the same frequency for output on different cables, as illustrated by the fourth through seventh spectral graphs of FIG. 6. For transmission over the microwave link, channels 606 and 608 may be received (stacked as in the third spectral graph or via separate cables as in the fourth through seventh spectral graphs) via the ODU/IDU interface. The channels 606 may then be upconverted to respective microwave frequencies for transmission via transceiver $502_1$ and the channels 608 may then be upconverted to respective microwave frequencies for transmission via transceiver $502_2$.

In accordance with an example implementation of this disclosure, a monolithic integrated circuit (e.g., 402) for use in a microwave backhaul system may comprise a plurality of microwave transceivers (e.g., $502_1$-$502_8$) and outdoor-unit to indoor-unit (ODU/IDU) interface circuitry (e.g., 510). The monolithic integrated circuit may be configurable into an all-outdoor configuration in which the ODU/IDU interface circuitry is disabled. The monolithic integrated circuit may also be configurable into a split-indoor-and-outdoor configuration in which the ODU/IDU interface circuitry is enabled to communicate signals between an outdoor unit of the microwave backhaul system and an indoor unit of the microwave backhaul system. While the monolithic integrated circuit is configured in the split-indoor-and-outdoor configuration, the ODU/IDU interface circuitry may be configurable to operate in at least a non-stacking mode and a stacking mode. While the ODU/IDU interface circuitry is configured in the non-stacking mode, the ODU/IDU interface circuitry may upconvert each of a plurality of digital baseband signals to a particular frequency for communication over a plurality of cables (e.g., as shown by the fourth through seventh spectral graphs of FIG. 6). While the ODU/IDU interface circuitry is configured in the stacking mode, the ODU/IDU interface circuitry may upconvert each of a plurality of digital baseband signals to a respective one of a plurality of non-overlapping frequencies for communication over a single cable (e.g., as shown in the third spectral graph of FIG. 6). While the ODU/IDU interface circuitry is configured in the non-stacking mode, the ODU/IDU interface circuitry may be operable to downconvert each of a plurality of signals received at a particular frequency on a corresponding plurality of cables. While the ODU/IDU interface circuitry is configured in the stacking mode, the ODU/IDU interface circuitry may be operable to downconvert each of a plurality of signals received at a corresponding plurality of non-overlapping frequencies on a single cable. While the monolithic integrated circuit is configured into the split-indoor-and-outdoor configuration, the monolithic integrated circuit may be configurable to operate in an outdoor-unit mode and an indoor-unit mode. The monolithic integrated circuit may be configured into the outdoor-unit mode when it is instantiated in the outdoor unit of the microwave backhaul system. The monolithic integrated circuit may be configured into the indoor-unit mode when it is instantiated in the indoor unit of the microwave backhaul system. The monolithic integrated circuit may be located at or near a focal plane of a parabolic reflector or lens of the microwave backhaul system when instantiated in the outdoor unit of the microwave backhaul system. The monolithic integrated circuit may comprise modulation and demodulation circuitry (e.g., 508). While the monolithic integrated circuit is configured into the all-outdoor configuration, the modulation and demodulation circuitry may demodulate signals received via the plurality of microwave transceivers. While the monolithic integrated circuit is configured into the split-indoor-and-outdoor configuration, the modulation and demodulation circuitry may be configured based on whether the monolithic integrated circuit is configured in the indoor-unit mode or the outdoor-unit mode. While the monolithic integrated circuit is configured in the outdoor-unit mode, the modulation and demodulation circuitry may be powered down. While the monolithic integrated circuit is configured in the indoor-unit mode, the modulation and demodulation circuitry may be configured to demodulate signals received from the ODU/IDU interface circuitry. The monolithic integrated circuit may comprise media independent interface circuitry (e.g., 512) operable to communicate signals between the modulation and demodulation circuitry and a network interface (e.g., 514) that is external to the monolithic integrated circuit. The monolithic integrated circuit may comprise digital baseband processing circuitry (e.g., 504). The plurality of microwave transceivers may be configured to process signals from a corresponding plurality of antenna elements to generate a plurality of first phase quadrature digital baseband signal pairs. The digital baseband processing circuitry may be operable to process the first phase quadrature digital baseband signal pairs to generate a plurality of second phase quadrature digital baseband signal pairs. The digital baseband processing circuitry may be operable to convey the plurality of second phase quadrature digital baseband signal pairs to the modulation and demodulation circuitry and to the ODU/IDU interface circuitry.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
a monolithic integrated circuit for use in a microwave backhaul system operable to communicate cellular signals, wherein:
said monolithic integrated circuit comprises a plurality of microwave transceivers, and outdoor-unit to indoor-unit (ODU/IDU) interface circuitry, wherein the plurality of microwave transceivers comprises one or more full-spectrum capture transceivers operable to concurrently digitize multiple non-overlapping channels to produce a single digital I/Q signal pair, wherein the single digital I/Q signal pair comprises one digital in-phase signal and one quadrature phase signal;
said monolithic integrated circuit is configurable into an all-outdoor configuration in which said ODU/IDU interface circuitry is disabled, said all-outdoor configuration being operable to provide the multiple non-overlapping channels via a network interface; and
said monolithic integrated circuit is configurable into a split-indoor-and-outdoor configuration in which said ODU/IDU interface circuitry is enabled to communicate the multiple non-overlapping channels between an outdoor unit of said microwave backhaul system and an indoor unit of said microwave backhaul system, wherein said monolithic integrated circuit is operable to perform cross polarization interference cancellation on different polarizations that are used for independent links, and wherein said monolithic integrated circuit is operable to concurrently transmit a first signal and receive a second signal, and wherein said first signal and said second signal are on different polarizations of a common frequency.

2. The system of claim 1, wherein:
while said monolithic integrated circuit is configured in said split-indoor-and-outdoor configuration, said ODU/IDU interface circuitry is configurable to operate in at least a non-stacking mode and a stacking mode;
while said ODU/IDU interface circuitry is configured in said non-stacking mode, said ODU/IDU interface circuitry upconverts each of a plurality of digital baseband signals to a particular frequency for communication over a plurality of cables; and
while said ODU/IDU interface circuitry is configured in said stacking mode, said ODU/IDU interface circuitry upconverts each of a plurality of digital baseband signals to a respective one of a plurality of non-overlapping frequencies for communication over a single cable.

3. The system of claim 2, wherein:
while said ODU/IDU interface circuitry is configured in said non-stacking mode, said ODU/IDU interface circuitry is operable to downconvert each of a plurality of signals received at a particular frequency on a corresponding plurality of cables; and
while said ODU/IDU interface circuitry is configured in said stacking mode, said ODU/IDU interface circuitry is operable to downconvert each of a plurality of signals received at a corresponding plurality of non-overlapping frequencies on a single cable.

4. The system of claim 1, wherein:
while said monolithic integrated circuit is configured into said split-indoor-and-outdoor configuration, said monolithic integrated circuit is configurable to operate in an outdoor-unit mode and an indoor-unit mode;
said monolithic integrated circuit is configured into said outdoor-unit mode when instantiated in said outdoor unit of said microwave backhaul system; and
said monolithic integrated circuit is configured into said indoor-unit mode when instantiated in said indoor unit of said microwave backhaul system.

5. The system of claim 4, wherein said monolithic integrated circuit is located at or near a focal plane of a parabolic reflector or lens of said microwave backhaul system when instantiated in said outdoor unit of said microwave backhaul system.

6. The system of claim 1, wherein:
said monolithic integrated circuit comprises modulation and demodulation circuitry;
while said monolithic integrated circuit is configured into said all-outdoor configuration, said modulation and demodulation circuitry demodulates signals received via said plurality of microwave transceivers; and
while said monolithic integrated circuit is configured into said split-indoor-and-outdoor configuration, said modulation and demodulation circuitry is configured based on whether said monolithic integrated circuit is configured in said indoor-unit mode or said outdoor-unit mode.

7. The system of claim 6, wherein:
while said monolithic integrated circuit is configured in said outdoor-unit mode, said modulation and demodulation circuitry is powered down; and
while said monolithic integrated circuit is configured in said indoor-unit mode, said modulation and demodulation circuitry is configured to demodulate signals received from said ODU/IDU interface circuitry.

8. The system of claim 6, wherein said monolithic integrated circuit comprises media independent interface circuitry operable to communicate signals between said modulation and demodulation circuitry and a network interface that is external to said monolithic integrated circuit.

9. The system of claim 8, wherein said monolithic integrated circuit comprises digital baseband processing circuitry.

10. The system of claim 9, wherein:
said plurality of microwave transceivers are configured to process signals from a corresponding plurality of antenna elements to generate a plurality of first phase quadrature digital baseband signal pairs;
said digital baseband processing circuitry is operable to process said first phase quadrature digital baseband signal pairs to generate a plurality of second phase quadrature digital baseband signal pairs; and
said digital baseband processing circuitry is operable to convey said plurality of second phase quadrature digital baseband signal pairs to said modulation and demodulation circuitry and to said ODU/IDU interface circuitry.

11. A method comprising:
performing in a monolithic integrated circuit for use in a microwave backhaul system operable to communicate cellular signals:
concurrently digitizing multiple non-overlapping channels to produce a single digital I/Q signal pair, wherein the single digital I/Q signal pair comprises one digital in-phase signal and one quadrature phase signal;
powering down ODU/IDU interface circuitry of said monolithic integrated circuit in response to determining that said microwave backhaul system is an all-outdoor system, said all-outdoor system being operable to provide the multiple non-overlapping channels via a network interface; and
configuring said ODU/IDU interface circuitry to communicate the multiple non-overlapping channels between an outdoor unit of said microwave backhaul system and an indoor unit of said microwave backhaul system in response to determining that said microwave backhaul system is a split-indoor-and-outdoor system, wherein said monolithic integrated circuit is operable to perform cross polarization interference cancellation on different polarizations that are used for independent links, and wherein said monolithic integrated circuit is operable to concurrently transmit a first signal and receive a second signal, and wherein said first signal and said second signal are on different polarizations of a common frequency.

12. The method of claim 11, comprising:
while said monolithic integrated circuit is configured in said split-indoor-and-outdoor configuration, configuring said ODU/IDU interface circuitry into one of a non-stacking mode and a stacking mode;
while said ODU/IDU interface circuitry is configured in said non-stacking mode, upconverting, via said ODU/IDU interface circuitry, each of a plurality of digital baseband signals to a particular frequency for communication over a plurality of cables; and
while said ODU/IDU interface circuitry is configured in said stacking mode, upconverting, via said ODU/IDU interface circuitry, each of a plurality of digital baseband signals to a respective one of a plurality of non-overlapping frequencies for communication over a single cable.

13. The method of claim 12, comprising:
while said ODU/IDU interface circuitry is configured in said non-stacking mode, downconverting, via said ODU/IDU interface circuitry, each of a plurality of signals received at a particular frequency on a corresponding plurality of cables; and
while said ODU/IDU interface circuitry is configured in said stacking mode, downconverting, via said ODU/IDU interface circuitry, each of a plurality of signals received at a corresponding plurality of non-overlapping frequencies on a single cable.

14. The method of claim 11, comprising:
while said monolithic integrated circuit is configured into said split-indoor-and-outdoor configuration:
configuring said monolithic integrated circuit into an outdoor-unit mode when said monolithic integrated circuit is instantiated in said outdoor unit of said microwave backhaul system; and
configuring said monolithic integrated circuit is into an indoor-unit mode when said monolithic integrated circuit is instantiated in said indoor unit of said microwave backhaul system.

15. The method of claim 14, wherein said monolithic integrated circuit is located at or near a focal plane of a parabolic reflector or lens of said microwave backhaul system when instantiated in said outdoor unit of said microwave backhaul system.

16. The method of claim 11, comprising:
while said monolithic integrated circuit is configured into said all-outdoor configuration, demodulating, via modulation and demodulation circuitry of said monolithic integrated circuit, signals received via said plurality of microwave transceivers; and
while said monolithic integrated circuit is configured into said split-indoor-and-outdoor configuration, configuring said modulation and demodulation circuitry based on whether said monolithic integrated circuit is configured in said indoor-unit mode or said outdoor-unit mode.

17. The method of claim 16, comprising:
while said monolithic integrated circuit is configured in said outdoor-unit mode, powering down said modulation and demodulation circuitry; and
while said monolithic integrated circuit is configured in said indoor-unit mode, demodulating, via said modulation and demodulation circuitry, signals received from said ODU/IDU interface circuitry.

18. The method of claim 17, comprising communicating signals between said modulation and demodulation circuitry of said monolithic integrated circuit and a network interface external to said monolithic integrated circuit via media independent interface circuitry of said monolithic integrated circuit.

19. The method of claim 18, wherein said monolithic integrated circuit comprises digital baseband processing circuitry.

20. The method of claim 19, comprising:
- processing, via said plurality of microwave transceivers, signals from a corresponding plurality of antenna elements to generate a plurality of first phase quadrature digital baseband signal pairs;
- processing, via said digital baseband processing circuitry, said first phase quadrature digital baseband signal pairs to generate a plurality of second phase quadrature digital baseband signal pairs; and
- conveying, by said digital baseband processing circuitry, said plurality of second phase quadrature digital baseband signal pairs to said modulation and demodulation circuitry and to said ODU/IDU interface circuitry.

* * * * *